March 26, 1963
F. BATTISTIN
3,082,634
VARIABLE-SPEED DRIVES
Filed Oct. 24, 1960
3 Sheets-Sheet 1
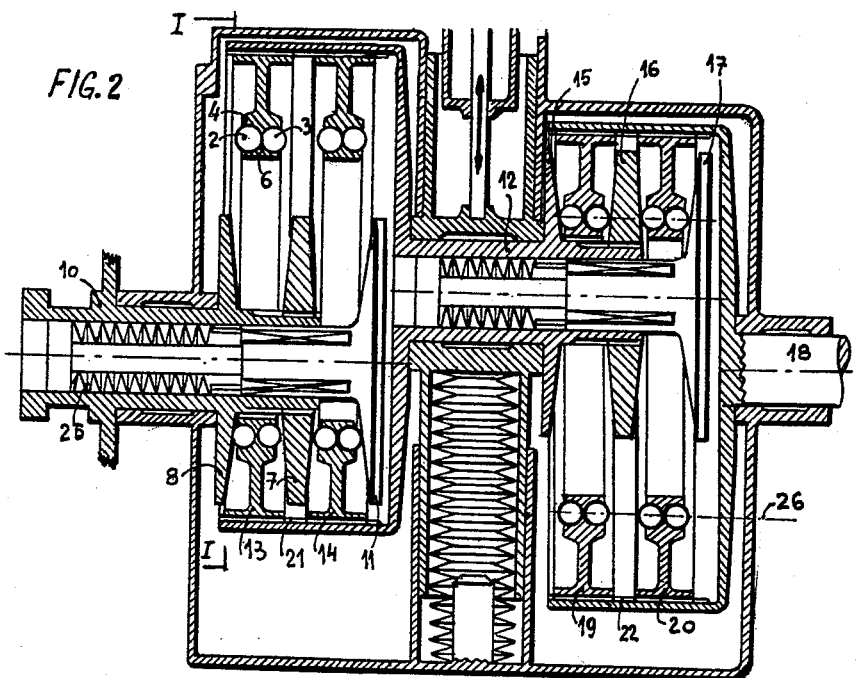
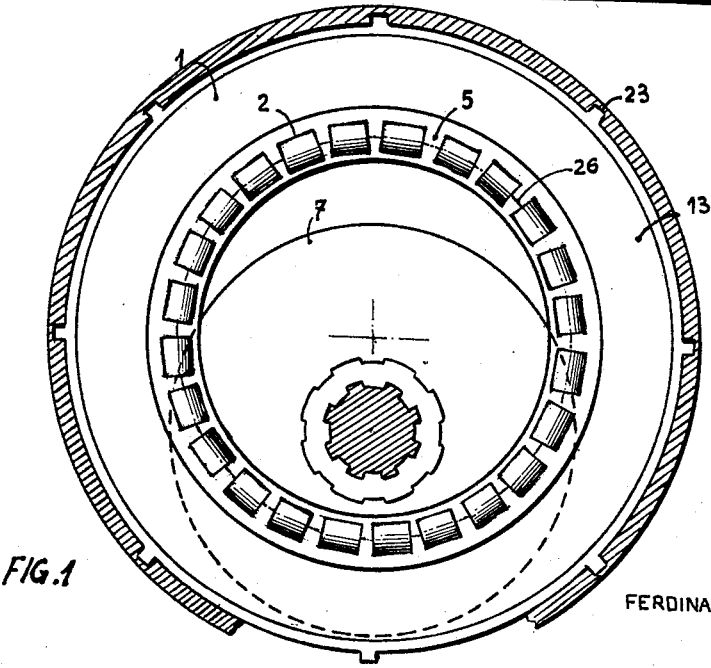
FERDINANDO BATTISTIN
*INVENTOR.*
BY Karl F. Ross
AGENT

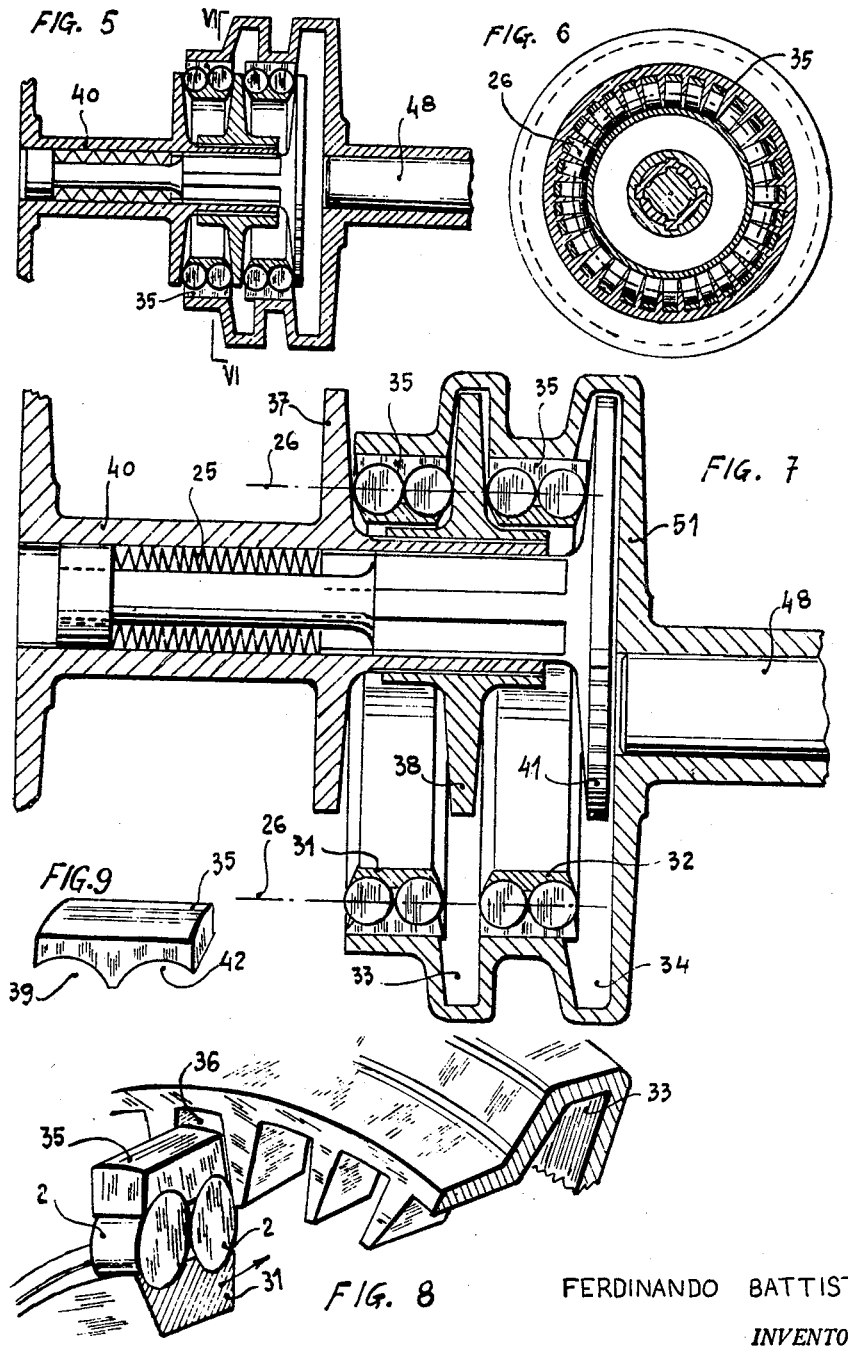

United States Patent Office

3,082,634
Patented Mar. 26, 1963

3,082,634
VARIABLE-SPEED DRIVES
Ferdinando Battistin, 41, Via Costanza, Milan, Italy
Filed Oct. 24, 1960, Ser. No. 64,443
Claims priority, application Italy Oct. 29, 1959
4 Claims. (Cl. 74—199)

This invention relates to a mechanical, stepless variable-speed drive and provides an arrangement wherein rotation is transmitted from a driving shaft to a driven shaft by engagement between discs and rollers arranged on appropriate rotatable circular supports, the discs being rigidly secured, for instance, to the driving shaft, while a ring of rollers is rigidly secured, for instance, to the driven shaft, whereby the transmission ratio may be varied by varying the distance between the axis of the driving shaft and the axis of the driven shaft.

The rollers are cylindrical. Preferably, the length of each roller is less than its diameter.

Such rollers are disposed in a circle in adjacent pairs and so as to project slightly from the two sides of the respective circular support, which latter may be a ring disposed inside a rotatable bell-shaped housing or may be a circular fillet inside a rotatable bell-shaped housing.

The rollers are preferably disposed with their axes tangential to a common circle and transverse to the axis of the circular support, i.e. the end faces of each roller are opposite end faces of the adjacent rollers.

In certain of the mechanical steplessly variable speed-change devices known at present, a ring is provided which is frictionally moved by two discs between which the ring is disposed. However, such speed-change devices have not come into widespread use because, owing to the considerable slip between the ring and the discs, they are not very efficient. Such slip consumes considerable power which is dissipated in the form of heat and wears the discs and the ring. On account of their disadvantages such known infinitely variable speed-change devices have not been used in motor vehicles.

The variable-speed drive according to this invention obviates all the disadvantages of the known infinitely variable speed-change devices and is of use more particularly for motor vehicles.

The invention will be described further, by way of example, with reference to the accompanying drawings which illustrate two embodiments of the variable-speed drive according to this invention, the two embodiments being given purely by way of non-limitative illustration of the scope of the invention. In the drawings:

FIG. 1 is a cross-sectional end view, taken along the line 1—1 of FIG. 2, of a first embodiment of drive according ti the invention;

FIG. 2 is a sectional view of the variable-speed drive of FIG. 1, taken along the axes of the shafts, the rings and discs being illustrated in their respective positions for maximum step-down between the driving shaft and the driven shaft;

FIG. 5 is a cross-sectional side elevation of a second embodiment of drive according to the invention, the parts thereof being shown in the positions in which the transmission ratio is unity, i.e., the driven shaft is directly coupled with the driving shaft by being disposed coaxially thereof;

FIG. 6 is a section perpendicular to the axis of the drive taken along the line VI—VI of FIG. 5;

FIG. 7 is a longitudinal sectional view, on an enlarged scale, of the drive of FIGS. 5 and 6, the parts being shown in their positions for maximum step-down;

FIG. 8 is an enlarged perspective detail view showing certain parts of the drive of FIGS. 5 to 7; and FIG. 9 is a perspective view of a bridge which forms part of the drive of FIGS. 5 to 8;

Figure 3:
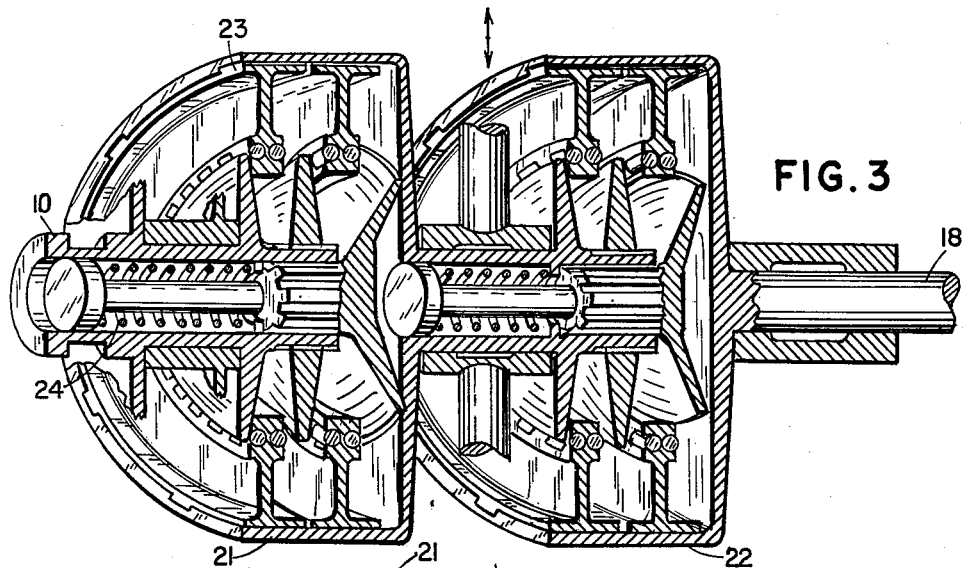
FIG. 3 is a diagrammatic cross-sectional perspective view of the drive with the parts thereof shown in the position corresponding to a transmission ratio of unity, i.e., the driven shaft is directly connected because the driving shaft and the driven shaft are disposed coaxially.
Figure 4:
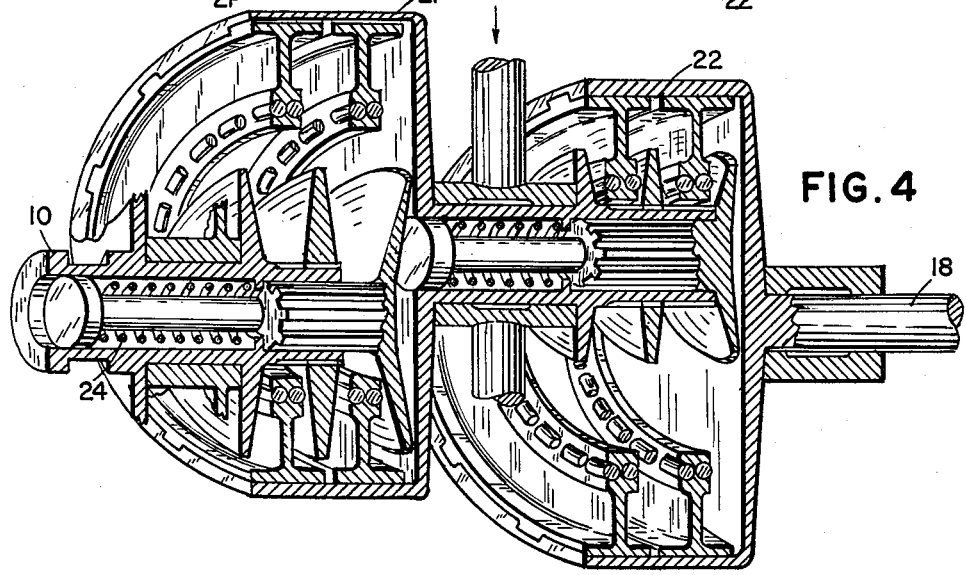
FIG. 4 is a view similar to FIG. 3 but with the parts thereof shown in their respective positions for maximum step-down.

The variable speed drive illustrated by way of example in FIGS. 1 to 4 comprises a hollow driving shaft 10 provided with three discs 7, 8 and 11; an intermediate shaft 12 with rings 13 and 14 disposed respectively between the discs 8, 7 and the discs 7, 11; discs 15, 16 and 17 connected with the intermediate shaft 12; and a driven shaft 18 provided with rings 19 and 20, disposed respectively between the discs 15, 16 and the discs 16, 17. The rings 13 and 14 are disposed in a bell-shaped housing 21 rigidly secured to the intermediate shaft 12, while the rings 19 and 20 are mounted in a bell-shaped housing 22 rigidly secured to the driven shaft 18. All of the rings 13, 14, 19 and 20 have axial guide ribs 23 on their outer curved surfaces by virtue of which such rings can each perform a limited axial movement in matching grooves in the inner surfaces of the respective bell-shaped housings 21 and 22.

Furthermore, each ring 13, 14, 19 and 20 has an inwardly directed flange 1 connecting the respective ring with a respective inner boss 5 provided with side-by-side recesses 4 arranged along common circles 26. As can be seen in FIG. 2, these recesses 4 are arranged in pairs and serve to accommodate two series of rollers 2, 3 which are partly separated by ridges 6 between the recess pairs and are spaced equidistantly around the boss 5. The discs 7, 11, 16 and 17 can also each perform limited axial movements on their respective shafts and are biased into permanent engagement with the respective rollers 2, 3 by springs which are shown as coil springs 24 in FIGS. 3 and 4 or as cup springs 25 in FIGS. 1 and 2. The intermediate shaft 12 can be shifted so that the distance between its axis and the axes of the shafts 10 and 18 can be varied. Such movement varies the transmission ratios and therefore the speed of the driven shaft 18 relative to the driving shaft 10.

The intermediate shaft 12 can be shifted by any known means, such as an automatic device which is connected to the driven shaft 18 and which moves the intermediate shaft appropriately when the speed of the driven shaft 18 exceeds predetermined limits. The speed of the driven shaft 18 with a given speed of the driving shaft 10 is reduced when the axis of the intermediate shaft 12 is moved away from the axes of the shafts 10 and 18, whereas the step-down transmission ratio between the driving shaft 10 and the driven shaft 18 is reduced proportionally as the axis of the intermediate shaft 12 is moved towards the axes of the shafts 10 and 18.

FIGS. 5 to 9 illustrate another embodiment of the invention. In this case the variable-speed drive comprises a hollow driving shaft 40 provided with three discs 37, 38 and 41 and a driven shaft 48 having a bell-shaped housing 51. The housing is shaped to accommodate two rings 31, 32 which each provide internal seats for two series of rollers 2 (FIG. 8) located, in pairs, in respective radial grooves 36 by retaining bridges 35.

Of course, the same principle of construction can be employed in a variable-speed drive comprising more than one such bell-shaped housing and such housing can constitute either a driving or a driven element of the drive and the bell housing or housings can each comprise one, two, three or more internal shoulders with respective radial grooves 36 adapted to receive the rollers 2 with the associated retaining bridges 35 and therefore have a corresponding number of annular grooves 33 or 34. The retaining bridges 35 are each of a width equal to the axial length of the radial grooves 36, and are preferably given an accurate sliding fit therein. The retaining bridges 35 must be able to slide slightly axially of the respective driving and driven shafts to ensure that the rollers 2 always engage the respective confronting surfaces of the discs 37 and 38, or 38 and 41 which are slightly conical. The bridges 35 each have, over their entire widths, two seats 39, 42 which are of arcuate shape and in which the external surfaces of the rollers 2 are received. Each intermediate ring 31 or 32 is assembled with the associated series of rollers 2 and bridges 35 by being introduced into the radial grooves 36 in the direction indicated by an arrow in FIG. 8. Such radial grooves 36 are equidistant from the bell-housing axis and are very close to one another so that the largest possible number or rollers are distributed around the housing circumference. The discs 38, 41 can slide axially on their respective shafts and, to ensure constant engagement with the respective rollers, are biased by a coil or cup spring 25.

In the arrangement according to this invention, the discs and the rollers can both be employed either as driving or as driven elements of the variable-speed drive. Each of them can, if required, be used alternately as a driven element and a driving element in a single variable-speed drive. The rollers can, if desired, be hollow or pierced.

The number of shafts, discs and rollers embodied in the variable-speed drive may, of course, be varied in accordance with the power, speed and transmission ratios required.

I claim:

1. A torque-transmitting device comprising a housing, an annular support member rotatably journaled in said housing, two axially spaced circular arrays of cylindrical rollers rotatably received in said support member, said rollers having coplanar axes which are tangent to a common cylindrical surface coaxial with said support member, the rollers of each array having portions projecting from said support member and tangent to a respective common plane generally perpendicular to the axis of rotation of said member, a shaft member journaled in said housing for rotation about an axis substantially parallel to the axis of rotation of said support member and encircled by said arrays, said shaft member being formed with two axially spaced, convergingly outwardly tapered discs bearing each upon the projecting portions of at least one of the rollers of a respective array for frictional interengagement therewith, one of said members being connectable to a source of motive power, and power-take-off means for connecting the other member with a load.

2. A device according to claim 1 wherein each of the rollers of one of said arrays frictionally engages a respective roller of the other array.

3. A torque-transmitting device comprising a housing, two axially spaced annular support members rotatably journaled in said housing for simultaneous rotation about a common axis, two axially spaced circular arrays of cylindrical rollers rotatably received in each of said support members, said rollers having coplanar axes which are tangent to a common cyclindrical surface coaxial with said support members, the rollers of each array having portions projecting from said support members and tangent to a respective common plane generally perpendicular to the axis of rotation of said members, a shaft journaled in said housing for rotation about an axis substantially parallel to the axis of rotation of said support members and encircled by said arrays, and three axially spaced, convergingly outwardly tapered disks on said shaft interleaved with and bearing upon the projecting portions of at least some of the rollers of respective arrays for frictional interengagement therewith.

4. A torque-transmitting device comprising a housing, two axially shiftable and spaced annular support members rotatably journaled in said housing for simultaneous rotation about a common axis, two axially spaced circular arrays of cylindrical rollers rotatably received in each of said support members, said rollers having coplanar axes which are tangent to a common cylindrical surface coaxial with said support members, the rollers of each array having portions projecting from said support members and tangent to a respective common plane generally perpendicular to the axis of rotation of said members, a shaft journaled in said housing for rotation about an axis substantially parallel to the axis of rotation of said support members and encircled by said arrays, at least three axially spaced convergingly outwardly tapered disks interleaved with and bearing upon the projecting portions of at least some of the rollers of respective arrays for frictional interengagement therewith, said disks being carried on said shaft with freedom of relative axial displacement, spring means bearing upon an outer one of said disks for urging said disks and said arrays into contact with one another, and speed-control means for adjusting the radical spacing between the axes of said support members and said shaft.

References Cited in the file of this patent

UNITED STATES PATENTS

| 970,995 | Dill | Sept. 20, 1910 |
| 1,410,722 | Rogers | Mar. 28, 1922 |
| 1,823,226 | Abbot | Sept. 15, 1931 |
| 2,583,496 | Rougelot | Jan. 22, 1952 |
| 2,595,439 | Arato | May 6, 1952 |

FOREIGN PATENTS

| 432,826 | Italy | Mar. 26, 1948 |
| 612,685 | Great Britain | Nov. 16, 1948 |